May 19, 1970

M. A. KOLTUNIAK ETAL
3,513,377
INDIVIDUAL INTERPHASE TRANSFORMERS
Filed Sept. 20, 1967

INVENTORS.
Michael A. Koltuniak,
Henry Tazzia
BY Harness, Dickey & Pierce
ATTORNEYS

3,513,377
INDIVIDUAL INTERPHASE TRANSFORMERS
Michael A. Koltuniak, Warren, and Henry Tazzia, Utica, Mich., assignors to The Udylite Corporation, Warren, Mich., a corporation of Delaware
Filed Sept. 20, 1967, Ser. No. 669,104
Int. Cl. H02m 7/08
U.S. Cl. 321—26                          7 Claims

ABSTRACT OF THE DISCLOSURE

A rectifying system having a plurality of diode networks interconnected in the secondary of the output circuit to provide an increased current carrying capability wherein each network of the diode system is provided with an interphase transformer connected to all of the phases within that diode system. The circuit is further provided with a bridge circuit interconnected with the secondary diodes and fuse elements of the secondary system, the bridge circuit providing an indication of a blown fuse.

Background of the invention

Figure 1:
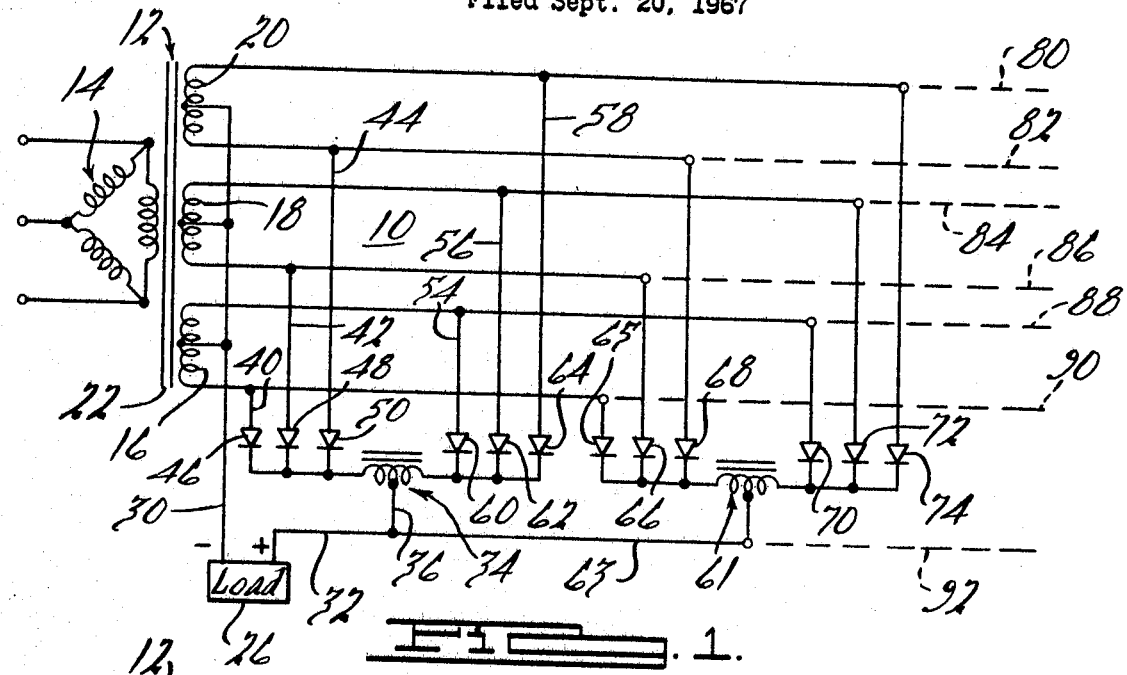

This invention relates generally to rectifier systems, and more particularly to rectifier systems incorporating paralleled diodes to increase the output current capability of the system, the system incorporating individual interphase transformers for each individual paralleled diode leg connected to a particular phase.

The prior art is replete with uses of single interphase transformers in a multiphase system, the interphase transformers producing superior electrical characteristics in the results derived from the rectifier system. The following is a table which illustrates a comparison of the particular parameters obtainable with two representative circuits, (1) not having interphase windings and (2) having an interphase transformer.

|  | Six phase star (three phase diametric) | Three phase double Y with interphase transformer |
|---|---|---|
| Average D.C. output current per rectifier element | 0.167 $I_{dc}$ | 0.167 $I_{dc}$ |
| RMS current per rectifier element (resistive load) | 0.409 $I_{dc}$ | 0.293 $I_{dc}$ |
| Peak current per rectifier (resistive load) | 1.05 $I_{dc}$ | 0.525 $I_{dc}$ |
| Ratio of peak to average current per rectifier element (resistive load) | 6.30 | 3.15 |
| Secondary line current | 0.408 $I_{dc}$ | 0.289 $I_{dc}$ |
| Transformer primary RMS amps per leg | 0.577 $I_{dc}$ | 0.408 $I_{dc}$ |

$I_{dc}$=Average D.C. output current.

A review of the above table illustrates that the system incorporating an interphase transformer provides an RMS and peak current output which is significantly less than the circuit which is not provided with an interphase transformer. The lower peak and RMS currents permit the rectifying elements to be more conservatively rated or components with lower ratings may be utilized. Furthermore, the transformer primary and secondary currents are also reduced which produce savings and efficiency in the transformer design.

However, a need has arisen for utilizing a plurality of paralleled rectifying elements or diodes in the above noted systems in order to increase the current carrying capabilities of the system without unduly increasing the cost of the total system due to the use of higher rated elements.

It has been found that a plurality of diodes may be paralleled by the use of individual interphase transformers, the transformers being magnetically separate, one from the other, for each paralleled rectifying element network. The following description illustrates the use of two individual interphase transformers for two paralleled rectifying element networks. However, it is to be understood that any number of rectifying elements may be paralleled by this system.

Several advantages result from this technique of interconnecting the secondary rectifying networks, as for example lower RMS and peak currents result from the use of interphase transformers enabling more efficient operation of the system and permitting derating of the rectifying components and transformers due to the lower currents. Further, the individual interphase transformers are of the same type as interphase transformers normally utilized in systems of this type but are smaller in size than the single interphase transformer, resulting in a more efficient design and flexibility in physically locating the transformers. This smaller size is the direct result from the fact that the individual interphase transformer only has to carry a fraction of the total output rather than the entire output as is the case with the present single interphase transformers.

It has been found that a certain degree of current balancing of the paralleled diode currents is achieved by the individual interphase transformer effect. Formerly, it was necessary to use a diode current balancing technique which performed the function of forcing the balancing of the diode currents between various paralleled diode legs. This necessitated the use of additional magnetic material and, depending upon the number of paralleled diodes often result in considerable wiring complexity to provide interaction between the diode legs by means of the magnetic material in the force balancing system.

The technique of the present invention provides balancing of the diode currents in each paralleled leg to a substantial degree and this result is accomplished due to true interphase action and not to the forced balance of the diode legs. In addition, this technique is applicable to rectifying elements whether they are germanium, silicon, or other materials, vacuum tubes, mercury rectifier, conventional diodes, silicon controlled rectifiers, or any other type of rectifying element. Also the technique is applicable to any number of phases in the system.

Accordingly, it is one object of the present invention to provide an improved rectifying system.

It is another object of the present invention to provide an improved rectifying system which is more efficient and less expensive than heretofore utilized systems.

It is still a further object of the present invention to provide a rectifying system with interphase transformer elements to provide interphase action while increasing the efficiency and decreasing the cost of the interphase transformer element.

It is still another object of the present invention to provide an individual interphase transformer system for use with a rectifying network wherein the system is provided with increased current carrying capabilities.

It is still another object of the present invention to provide a rectifier system having paralleled rectifying elements with interphase transformer elements wherein the interphase action is provided in addition to causing a balanced condition among the various paralleled legs of the system.

It is still another object of the present invention to provide a balanced paralleled rectifying system having interphase action which is applicable to any number of phases.

Rectifying elements often use fuses in series therewith to protect the element from damage and to open the circuit in the event the element becomes shorted. A large current overload in the particular leg in which the fuse is interconnected will cause the fuse to operate and provide an indication of the overload condition. The use of the individual interphase transformers described above has given rise to the discovery of a novel indicating circuit for indicating when the fuse is blown.

Accordingly, it is still another object of the present invention to provide an improved indicating circuit for use with rectifying systems.

It is still another object of the present invention to provide an improved system for indicating the presence of a blown fuse in a rectifying system utilizing individual interphase transformer elements.

Figure 2:
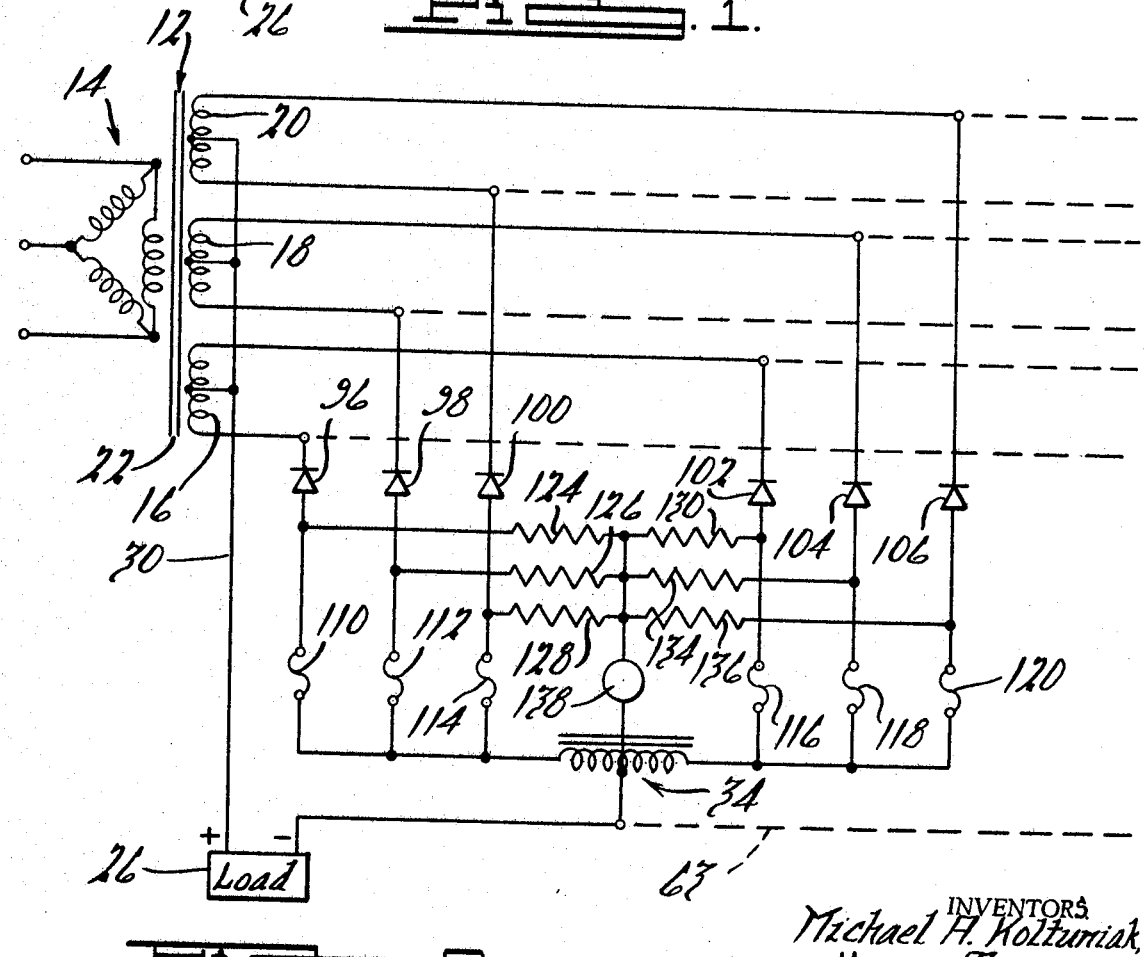

Further objects, features and advantages of this invention will become apparent from a consideration of the following description, the appended claims and the accompanying drawing in which:

FIG. 1 is a schematic diagram of a rectifying system incorporating an individual interphase transformer system of the present invention; and FIG. 2 is a system similar to FIG. 1 and further illustrating a novel bridge circuit which may be utilized to sense the fact of a blown fuse in a particular diode leg.

Referring now to FIG. 1, there is illustrated a rectifying system 10 which includes a transformer 12 having a three-phase delta connected primary winding 14 magnetically coupled with individual three-phase secondary windings 16, 18 and 20 through a core 22. The current being fed to the primary winding 14 is coupled to each of the secondary windings 16, 18 and 20 for feeding rectified direct current to a load 26.

The rectifier load current is fed to one side of the load through a negative buss 30 which is connected to a center-tap of each of the secondary windings 16, 18 and 20. The positive terminal of the load is interconnected with a positive buss 32 connected to the center-tap of an interphase transformer 34 by means of a conductor 36.

The interphase transformer 34 includes a transformer winding having a first end connected to each of the lower ends of the secondary windings 16, 18 and 20 by means of conductors 40, 42, 44 and rectifying elements, as for example, diodes 46, 48 and 50. The other end of the interphase transformer winding 34 is similarly interconnected with the upper ends of secondary transformer windings 16, 18 and 20 by means of conductors 54, 56 and 58 and rectifying elements in the form of diodes 60, 62 and 64.

Thus, with electrical energy being supplied to the primary winding 14, either the upper end or the lower end of secondary windings 16, 18, 20 becomes successively positive in accordance with the particular phase relationship of the windings 16, 18, 20 with respect to the individual windings of primary transformer windings 14. Accordingly, whichever end of the secondary windings 16, 18, 20 is positive with respect to the center-taps, current will flow through the particular windings 16, 18, 20 through the secondary conductors 40, 42, 44, 54, 56, 58, diodes 46, 48, 50, 60, 62, 64, respectively, and interphase transformer 24. In this way positive current is fed to the positive output buss 32.

A plurality of parallel connected diodes are interconnected with the respective ends of the secondary windings 16, 18, 20 and a second interphase transformer 61, which is also connected to the positive output buss 32 by means of a conductor 63. Accordingly, a diode 65 is connected in parallel with diode 46 between the lower end of secondary winding 16 and the output positive buss 32. A similar relationship exists between diode 48 and a diode 66, diode 50 and a diode 68, diode 60 and a diode 70, diode 62 and a diode 72 and diode 64 and a diode 74.

Thus, with the lower end of secondary winding 16 positive with respect to the center-tap of secondary winding 16, current will flow through both diodes 46 and 64, through the respective interphase transformer windings 34, 61 and through conductors 36, 63, respectively, to output buss 32. It has been found that the current flowing in each of the parallel legs 46, 65, very closely approximates each other to indicate that a balancing of the current flowing in the parallel legs is achieved by means of the interphase transformers 34, 61. A similar relationship exists between each of the other parallel connected legs and it is to be understood that any number of parallel networks and interphase transformers may be added to output conductors 80, 82, 84, 86, 88 and 90 in a manner similar to the connection of diodes 65 to 74 and interphase transformer 61.

Referring now to FIG. 2, there is illustrated a similar circuit to that illustrated in FIG. 1 with the exception that the diodes in this figure have been reversed to illustrate a reverse polarity load. Similar reference numerals for elements in FIG. 1 have been given to the corresponding elements in FIG. 2, and only one parallel network has been illustrated. However, it is to be understood that any number of parallel rectifying networks may be provided as was the case with FIG. 1.

In the circuit of FIG. 2 a plurality of diodes 96, 98 and 100 have been connected to the lower end of each of the secondary output windings 16, 18, 20 and a second plurality of diodes 102, 104 and 106 have been connected to the corresponding upper ends of secondary windings 16, 18 and 20. Each of the secondary output circuits have been provided with fuses 110, 112, 114, 116, 118, 120, as is common in the art.

In order to sense the occurrence of a fault in the respective fuse circuits 110 to 120, a plurality of resistors 124, 126, 128, 130, 134, 136 and a single current sensitive relay 138 have been connected with each of the fuses 110 to 120 respectively, as shown in FIG. 2. Accordingly, when a fuse 110 to 120 blows, a voltage is developed across the particular resistor 124 to 136 corresponding to the blown fuse and the relay 138 is operated to indicate the fault. In this way the operator is notified of the blown fuse condition. The relay 138 is purely illustrative and some other type of indicating instrument may be provided, as for example, a light, bell or the like.

What is claimed is:

1. In a system for rectifying alternating current to direct current including a source of alternating current electrical energy; means for rectifying said alternating current energy to direct current including a first single way multiple circuit rectifying means and a second single way multiple circuit rectifying means, said second single way multiple circuit rectifying means being connected in parallel circuit with said first single way multiple circuit rectifying means for optimizing the current carrying capacities of the system, said first and second rectifying means both comprising a plurality of unidirectionally conducting elements, and an interphase transformer means including a first interphase transformer connected to the plurality of unidirectionally conducting elements within said first rectifying means and a second interphase transformer connected to the plurality of unidirectionally conducting elements within said second rectifying means, said first and second interphase trasnformers being substantially magnetically independent.

2. The system of claim 1 wherein the source of alternating current is of a polyphase configuration and the system includes at least one individual interphase transformer connected with all phases of said polyphase source.

3. The system of claim 2 wherein the source of electrical energy includes a polyphase transformer having a plurality of secondary windings, each of said interphase transformers being commonly connected at one end thereof to corresponding ends of each of said secondary windings and the other end of said interphase transformer being commonly connected to the other corresponding ends of each of said secondary windings.

4. The system of claim 3 wherein said secondary windings are center-tapped to provide a direct current output of one polarity and said interphase transformers are center-tapped to provide a direct current output of the opposite polarity to said one polarity.

5. In the system of claim 1 which further includes a fuse element connected in circuit with said rectifying means, and sensing means connected in circuit with each of said interphase transformers and in circuit with the fuse elements for providing an indication of a blown condition of the fuse elements.

6. In the system of claim 1 which further includes a fuse element connected in circuit with said rectifying means, and sensing means connected in circuit with each of said interphase transformers and in circuit with the fuse elements for providing an indication of a blown condition of the fuse elements and wherein the source of electrical energy includes a polyphase transformer having a plurality of secondary windings, each of said interphase transformers being commonly connected at one end thereof to corresponding ends of each of said secondary windings, and the other end of said interphase transformer being commonly connected to the other corresponding ends of each of said secondary windings.

7. The system of claim 6 wherein said secondary windings are center-tapped to provide a direct current output of one polarity and said interphase transformers are center-tapped to provide a direct current output of the opposite polarity to said one polarity.

References Cited

UNITED STATES PATENTS

| | | | |
|---|---|---|---|
| 2,337,918 | 12/1943 | Moyer | 321—26 |
| 2,813,243 | 11/1957 | Christian et al. | 321—27 X |
| 3,056,037 | 9/1962 | Diebold | 321—27 X |
| 3,421,071 | 7/1969 | Cassel | 321—26 |

FOREIGN PATENTS 976,803  12/1964  Great Britain.

J D MILLER, Primary Examiner

G. GOLDBERG, Assistant Examiner

U.S. Cl. X.R.

315—142; 321—27